(12) United States Patent
Lee et al.

(10) Patent No.: US 9,522,440 B2
(45) Date of Patent: Dec. 20, 2016

(54) SPOT WELDING APPARATUS

(71) Applicant: Hyundai Motor Company, Seoul (KR)

(72) Inventors: So Young Lee, Gyeonggi-do (KR); Sung Phil Ryu, Seoul (KR)

(73) Assignee: Hyundai Motor Company, Seoul (KR)

( * ) Notice: Subject to any disclaimer, the term of this patent is extended or adjusted under 35 U.S.C. 154(b) by 320 days.

(21) Appl. No.: 14/144,088

(22) Filed: Dec. 30, 2013

(65) Prior Publication Data

US 2015/0183049 A1    Jul. 2, 2015

(30) Foreign Application Priority Data

Oct. 14, 2013   (KR) ........................ 10-2013-0122246

(51) Int. Cl.
*B23K 11/11*   (2006.01)
*B23K 11/31*   (2006.01)

(52) U.S. Cl.
CPC ............ *B23K 11/314* (2013.01); *B23K 11/115* (2013.01); *B23K 11/311* (2013.01); *B23K 11/312* (2013.01); *Y10S 901/42* (2013.01)

(58) Field of Classification Search
CPC ... B23K 11/314; B23K 11/312; B23K 11/115; B23K 11/311; Y10S 901/42
USPC ......................................... 219/86.33; 901/42
See application file for complete search history.

(56) References Cited

U.S. PATENT DOCUMENTS

| | | | |
|---|---|---|---|
| 6,337,456 B1 * | 1/2002 | Taniguchi | B23K 11/315 219/86.25 |
| 2012/0125974 A1 * | 5/2012 | Kwon | B23K 11/11 228/8 |
| 2013/0037528 A1 * | 2/2013 | Ogake | B23K 11/0033 219/127 |
| 2015/0136742 A1 * | 5/2015 | Morita | B23K 11/11 219/86.7 |

FOREIGN PATENT DOCUMENTS

| | | |
|---|---|---|
| JP | 11-170064 A | 6/1999 |
| JP | 2013188783 A * | 9/2013 |
| KR | 10-0418795 B1 | 2/2004 |
| KR | 10-2011-0080045 A | 7/2011 |
| KR | 10-2012-0051557 A | 5/2012 |
| KR | 20120051557 A * | 5/2012 |

* cited by examiner

*Primary Examiner* — David Angwin
*Assistant Examiner* — Biniam Asmelash
(74) *Attorney, Agent, or Firm* — Mintz Levin Cohn Ferris Glovsky and Popeo, P.C.; Peter F. Corless (57) ABSTRACT

A spot welding apparatus is provided that includes a fixation panel mounted on an arm of a robot. An upper welding gun is vertically installed on a front of the fixation panel, reciprocates vertically through a pressing unit and moves horizontally toward the fixation panel. A left and right moving unit is installed between the fixation panel and the pressing unit to move the upper welding gun horizontally. Further, two or more lower welding guns are horizontally disposed to correspond to the upper welding gun, and an upper and lower moving unit are installed on the fixation panel to reciprocate the lower welding gun vertically.

10 Claims, 9 Drawing Sheets

SPOT WELDING APPARATUS

CROSS-REFERENCE TO RELATED APPLICATION

This application claims priority to and the benefit of Korean Patent Application No. 10-2013-0122246 filed in the Korean Intellectual Property Office on Oct. 14, 2013, the entire contents of which are incorporated herein by reference.

BACKGROUND (a) Field of the Invention

The present invention relates to a spot welding apparatus, and more particularly, to a spot welding apparatus that performs a welding operation by selecting a lower welding gun that matches a welding spot of a welding target to be universally applied to multiple car models and enable a rapid welding operation in a limited space with a minimum time period.

(b) Description of the Related Art

In general, during a manufacturing process of a vehicle, various structural parts such as a vehicle body panel molded by a press, and the like are bonded by a method such as welding to complete an integrated vehicle body. The completed vehicle body is painted and rust-prevention is applied throughout the surface of each part in a painting process. Thereafter, a design process is performed, such as assembling a part of a power train system and parts such as suspension, steering, and braking systems and subsequently, assembling a door and a trunk lid, a hood, and the like.

Further, in a vehicle body assembling process of the vehicle, spot resistance welding through a spot welding apparatus is frequently used as a method for bonding two vehicle body panels such as a roof, a pillar, a side panel, an opening unit flange of a vehicle body door, and the like.

The spot resistance welding is a process in which contacting metal surfaces are joined by the heat obtained from resistance to electric current. As such, the weld is typically made by holding work-pieces together under pressure exerted by electrodes. via a spot welding apparatus installed at an arm front end of a robot for spot welding.

A welding gun used in spot welding apparatus are divided into three types: an X-type welding gun, a C-type welding gun, and a special-type welding gun adopting a special lower arm according to the position of a welding portion and interference with the vehicle body.

One spot welding apparatus selectively adopting the X-type welding gun, the C-type welding, and the special-type welding gun is installed through an arm of a robot. As a result, a first robot in which the spot welding apparatus adopting the X-type welding gun is installed, a second robot in which a spot welding apparatus adopting the C-type welding gun is installed, and a third robot in which a spot welding apparatus adopting the special-type welding gun is installed are installed in sepaaratelyto achieve the appropriate spot welding operations.

However, in the conventional spot welding operation, since one spot welding apparatus is installed in the robot arm for each robot, only one spot is welded whenever the robot arm moves, and as a result, a lot of time is required to perform a predetermined number of welding spot operations, thereby degrading productivity and efficiency.

Further, lower welding guns having different shapes should be adopted according to the position and the shape of the welding spot, and as a result, facility investment costs increase, and in particular, when a plurality of robots mounted with a spot welding apparatus adopting a lower welding gun having a special shape is used, facility and maintenance costs increase and energy is excessively used. Additionally, a space occupancy rate of the robot in a mass production line also increases.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a spot welding apparatus that performs a welding operation by including a plurality of lower welding guns and automatically selecting a lower welding gun of the plurlaity of welding guns according to various welding spots of a welding target to be universally applied to multiple vehicle models, rapidly perform a welding operation in a limited amount of space within a minimum amount of time to improve productivity, flexibility, and efficiency of a vehicle body process, and reduce the number of robots through application of one apparatus to save on installation cost.

An exemplary embodiment of the present invention provides a spot welding apparatus, including: a fixation panel mounted on an arm of a robot; an upper welding gun vertically installed on a front of the fixation panel, reciprocating vertically through a pressing unit and moved horizontally to the fixation panel; a left and right moving unit installed between the fixation panel and the pressing unit to move the upper welding gun horizontally; two or more lower welding guns horizontally disposed to correspond to the upper welding gun; and an upper and lower moving unit installed on the fixation panel to reciprocate the lower welding gun vertically.

The pressing unit may include a gear box provided at the top of the upper welding gun, a pressing actuator mounted at one lower side of the gear box, and a moving block vertically installed at another lower side of the gear box and reciprocating on a screw shaft that is rotated by receiving actuation of the pressing actuator through the gear box.

The left and right moving unit may include a rail horizontally installed on the fixation panel, a slide block installed on the rail and connected with the pressing unit, and a cylinder provided at one side of the pressing unit to move the pressing unit horizontally on the rail. The pressing actuator may be formed by a step motor of which an RPM and a rotational direction are controllable. In the left and right moving unit, the rails and the slide blocks may be configured in multiple on the fixation panel.

The upper and lower moving unit may include a cylinder connected to correspond to the lower welding guns on the fixation panel in the rear of the pressing unit, and an ascending and descending means installed between the lower welding gun and the fixation panel to guide ascension and decension of the lower welding gun by actuation of the cylinder.

The ascension and decension means may include a vertical rail installed on the fixation panel, and a guide block joined to the vertical rail and connected with an arm of the lower welding gun.

The lower welding gun may include first and second lower welding guns having different sshaped welding tips.

The cylinder may be include a first cylinder and a second cylinder that correspond to the first and second lower welding guns.

Furthermore, in some exemplary embodiments, a current conduction unit that conducts current to the upper welding gun and the lower welding gun may be installed on the fixation panel. The current conduction unit may include a transformer installed on the fixation panel, and a bus bar connected with the transformer to conduct current to the upper welding gun and the lower welding gun.

According to an exemplary embodiment of the present invention, a welding operation is performed while automatically selecting a corresponding lower welding gun among a plurality of lower welding guns according to various welding spots of a welding target while an upper welding gun moves horizontally to perform a rapid welding operation in a limited amount of space within a minimum time period.

Advantageously, the spot welding apparatus can be universally applied to multi vehicle models regardless of a vehicle model, and the position and the shape of a welding spot and enables a rapid welding operation to improve productivity, and flexibility and efficiency of a vehicle body process, and reduce the number of robots installed on a manufacturing line through application of one apparatus to save on facility investment cost.

DETAILED DESCRIPTION OF THE EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings. However, since the size and the thickness of each component illustrated in the drawings are arbitrarily expressed, the present invention is not particularly limited to the size and the thickness illustrated in the drawings and the thickness is enlarged in order to clearly express various parts and areas.

Parts which are not associated with a description are omitted in order to clearly describe the exemplary embodiments of the present invention, and names of elements in the following description are distinguished into first, second, and the like in order to distinguish the elements because the names of the elements are the same and are not particularly limited to an order thereof.

However, in describing an exemplary embodiment of the present invention, a spot welding apparatus 1 according to an exemplary embodiment of the present invention includes a plurality of lower welding guns and performs a welding operation while the upper welding gun presses a welding spot by automatically selecting the lower welding gun to correspond to various welding spots of a welding target.

As a result, the spot welding apparatus according to the exemplary embodiment of the present invention may be universally applied to multi vehicle models and rapidly perform welding operation in a limited amount of space within a minimum amount of time to improve productivity, flexibility, and efficiency of a vehicle body process, and reduces the number of robots through application of one apparatus to save on installation cost.

Figure 1:
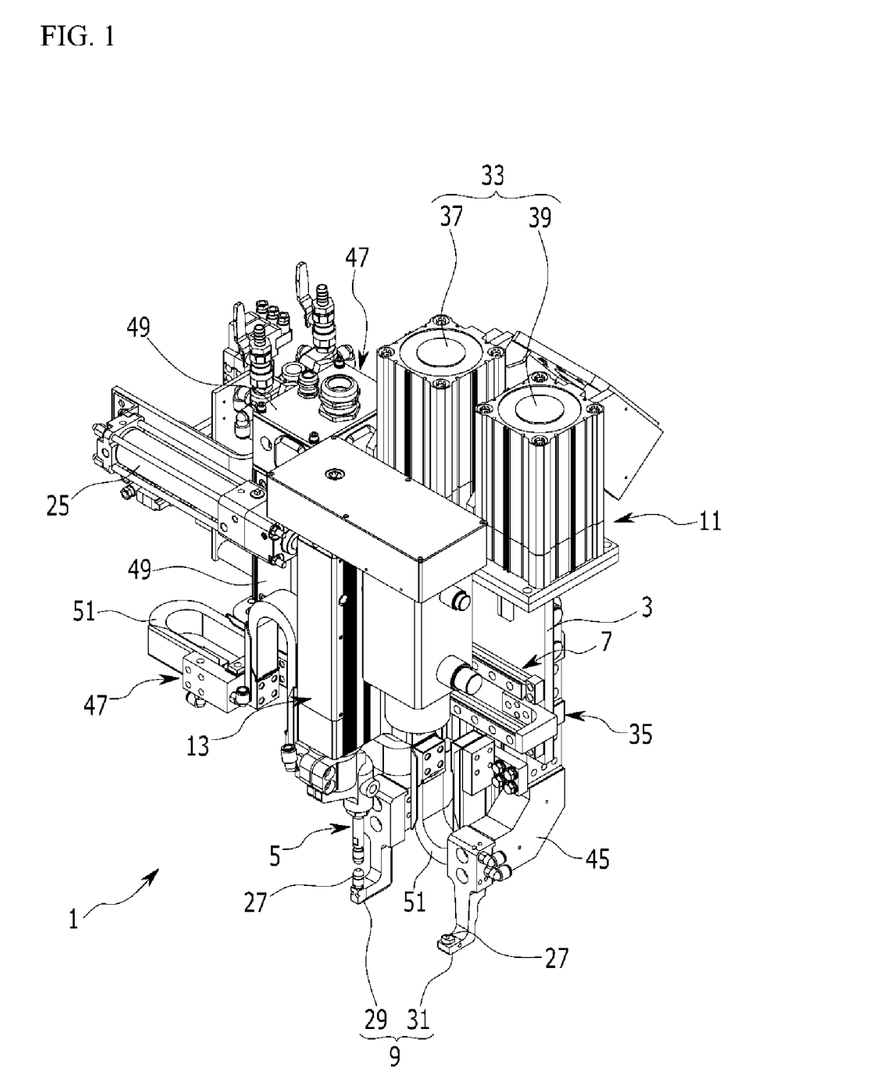
FIG. 1 is a perspective view of a spot welding apparatus according to an exemplary embodiment of the present invention.

FIG. 1 is a perspective view of a spot welding apparatus according to an exemplary embodiment of the present invention. Referring to FIG. 1, a spot welding apparatus 1 according to an exemplary embodiment of the present invention includes a fixation panel 3, an upper welding gun 5, a left and right moving unit 7, a lower welding gun 9, and an upper and lower moving unit 11.

The fixation panel 3 has a mounting portion (not illustrated) mounted on a robot arm (not illustrated) formed at one side thereof to be mounted on the robot arm. The upper welding gun 5 is vertically installed on a front of the fixation panel 3 to reciprocate vertically through a pressing unit 13. The pressing unit 13 presses a top of a welding spot of a welding target while vertically moving the upper welding gun 5.

Figure 2:
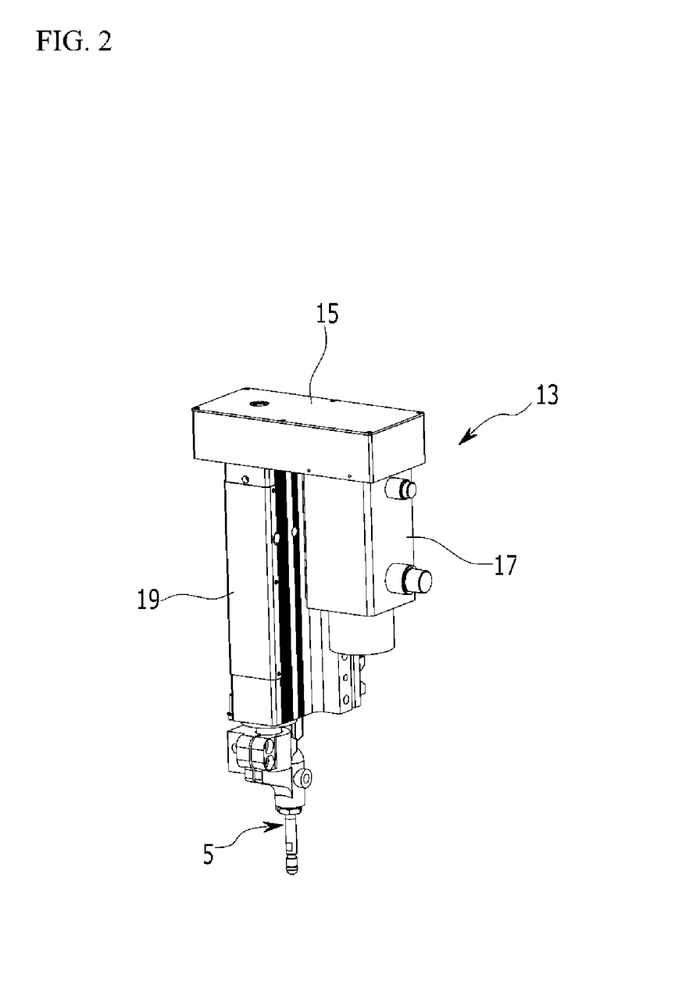
FIG. 2 is a perspective view of a pressing unit of the spot welding apparatus according to the exemplary embodiment of the present invention.

FIG. 2 is a perspective view of a pressing unit of the spot welding apparatus according to the exemplary embodiment of the present invention. Referring to FIG. 2, the pressing unit 13 includes a gear box 15, a pressing actuator 17, and a moving block (not illustrated). The gear box 15 is provided at an upper side of the upper welding gun 5 on the front of the fixation panel 3.

The pressing actuator 17 may be installed in parallel to the upper welding gun 5 at one side of the gear box 15. In this case, the pressing actuator 17 may be formed by a step motor of which an RPM and a rotational direction are controllable.

The moving block (not illustrated) is installed through a vertical case 19 vertically installed at the other side of the gear box 15, and is provided to reciprocate vertically on a screw shaft (not illustrated) that receives actuation of the pressing actuator 17 through the gear box 15 and is rotated in the vertical case 19.

Herein, the upper welding gun 5 is mounted on the moving block and the upper welding gun 5 is vertically moved by the actuation of the pressing actuator 17 during the welding operation. Meanwhile, the pressing actuator 17 may be formed by a roller screw actuator that converts rotational torque of an electric motor into a linear motion.

The pressing actuator 17 rotates the screw shaft (not illustrated) positioned in parallel to the pressing actuator 17 through the gear box 15, and as a result, the motion of the moving block 31 is converted into the linear motion on the screw shaft to reciprocate the upper welding gun 5 vertically.

The roller screw actuator is based on a configuration in which a nut-type moving block that engages in a thread of a screw shaft moves forward/backward while a screw shaft connected to a driving shaft of the electric motor is rotated by motor driving force. Therefore, since a configuration of the roller screw actuator which may be adopted as an actuator is a known configuration which is used widely across industries, a detailed description thereof will be omitted. Additionally, the left and right moving unit 7 may be installed on the fixation panel 3 between the fixation panel 3 and the pressing unit 13 to guide horizontal movement of the upper welding gun 5.

Figure 3:
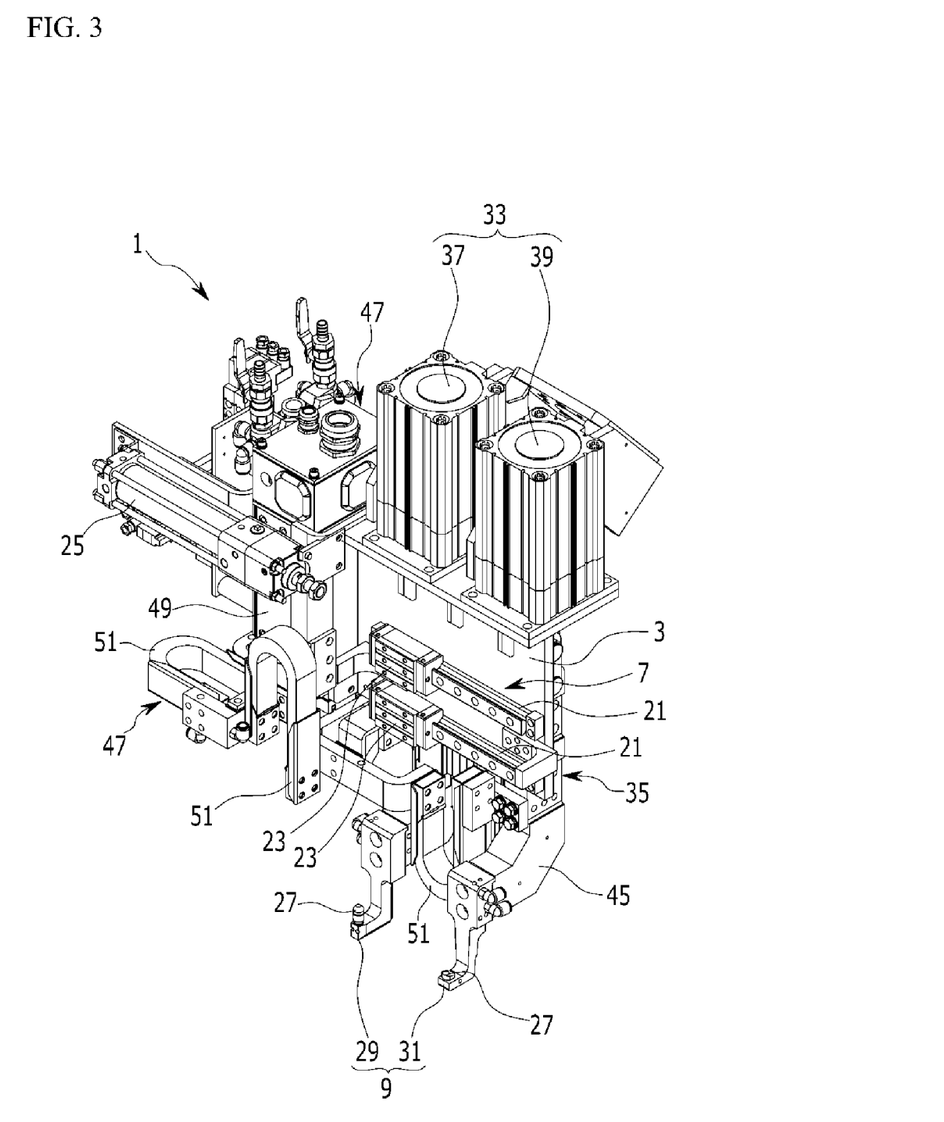
FIG. 3 is a perspective view of a left and right moving unit of the spot welding apparatus according to the exemplary embodiment of the present invention.

FIG. 3 is a perspective view of a left and right moving unit of the spot welding apparatus according to the exemplary embodiment of the present invention. Referring to FIG. 3, the left and right moving unit 7 includes a rail 21, a slide block 23, and a cylinder 25.

The rail 21 is horizontally installed on the fixation panel 3 between the left and right moving unit 7 and the fixation panel 3. In addition, the slide block 23 is movably joined onto the rail 21 and is connected with the vertical case 19 of the pressing unit 13.

The cylinder 25 in the exemplary embodiment of the present invention is horizontally provided on one side of the vertical case 19 of the pressing unit 13 to be connected through a cylinder rod (not illustrated) and moves the pressing unit 13 horizontally on the rail 21 by actuation of the cylinder rod. In this case, the cylinder 25 may be formed by a pneumatic cylinder.

Therefore, as the left and right moving unit 7 moves the pressing unit 13 to one side, the upper welding gun 5 also moves horizontally on the rail 21. In addition, in the left and right moving unit 7, the rails 2 and the slide blocks 23 may be configured vertically in a plurality thereof on the fixation panel 3. As a result, while the left and right moving unit 7 is more solidly connected and supported to the vertical case 19 of the pressing unit 13, the left and right moving unit 7 may move the pressing unit 13 to one side.

Meanwhile, one or more lower welding guns 9 are horizontally spaced apart from each other on the bottom of the fixation panel 3 to correspond to the upper welding gun 5. In this case, the lower welding gun 9 may include a first lower welding gun 29 and a second lower welding gun 31 having different shapes of the welding tips 27. In addition, the upper and lower moving unit 11 is installed on the fixation panel 3 to reciprocate the lower welding gun 9 vertically.

Figure 4:
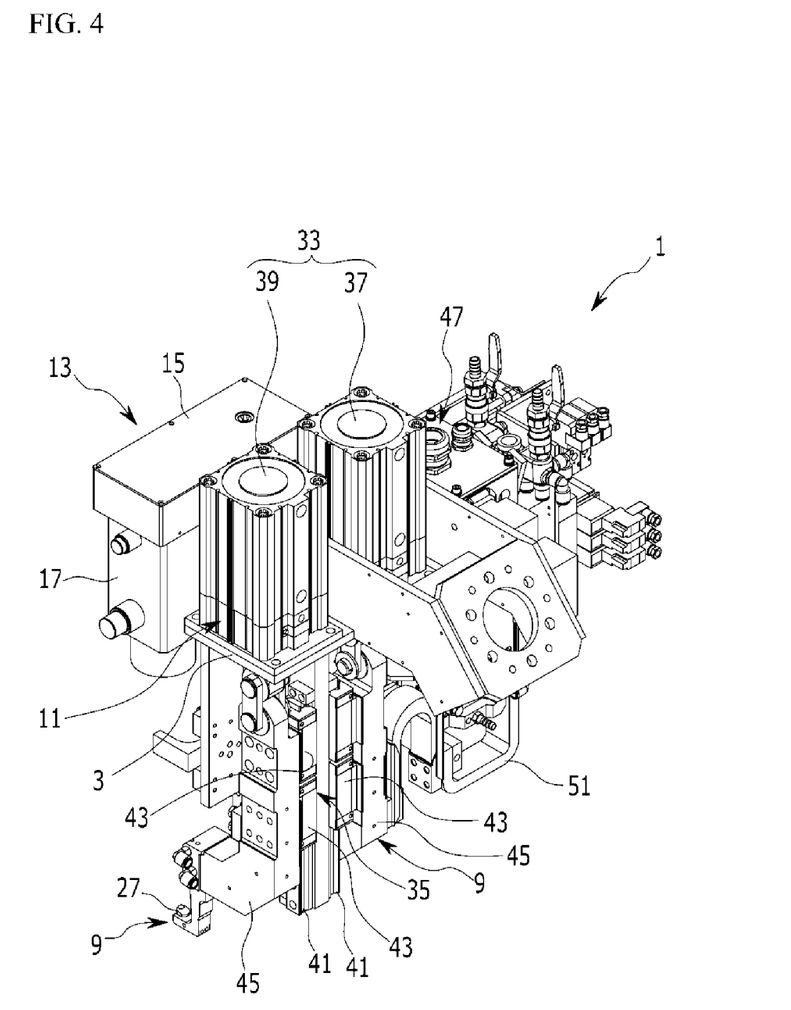
FIG. 4 is a perspective view of an upper and lower moving unit of the spot welding apparatus according to the exemplary embodiment of the present invention.

FIG. 4 is a perspective view of an upper and lower moving unit of the spot welding apparatus according to the exemplary embodiment of the present invention. Referring to FIG. 4, the upper and lower moving unit 11 includes a cylinder 33 and an ascending and descending means 35. The cylinder 33 is installed on the top of the fixation panel 3 in the rear of the pressing unit 13 to be correspondingly connected with the lower welding gun 9.

In this case, the cylinder 33 may be formed of the pneumatic cylinder and may include a first cylinder 37 and a second cylinder 39 that correspond to the first lower welding gun 29 and the second lower welding gun 31, respectively.

Therefore, the first and second cylinders 37 and 39 are connected with the first and second lower welding guns 29 and 31, respectively through an actuating rod to independently move the first and second lower welding guns 29 and 31 vertically.

The ascending and descending means 35 is installed on the fixation panel 3 between the lower welding gun 9 and the fixation panel 3 to guide ascension and descension of the lower welding gun 9 according to actuation of the cylinder 25.

In this case, the ascending and descending means 35 may be installed in a plurality in order to guide each of the first lower welding gun 29 and the second lower welding gun 31, respectively.

Additionally, since the ascending and descending means 35 is a known configuration used across industries in which a guide block 43 is moved on a vertical rail 41, a detailed configuration will be omitted.

The vertical rail 41 may provided vertically between the lower welding gun 9 and the fixation panel 3. In addition, the guide block 43 is movably joined onto the vertical rail 41 to be connected with an arm 45 of the lower welding gun 9. Therefore, when the lower welding gun 9 ascends and descends with actuation of the upper and lower moving unit 11, the lower welding gun 9 ascends and descends vertically while the arm 45 is guided on the vertical rail 41.

Figure 5:
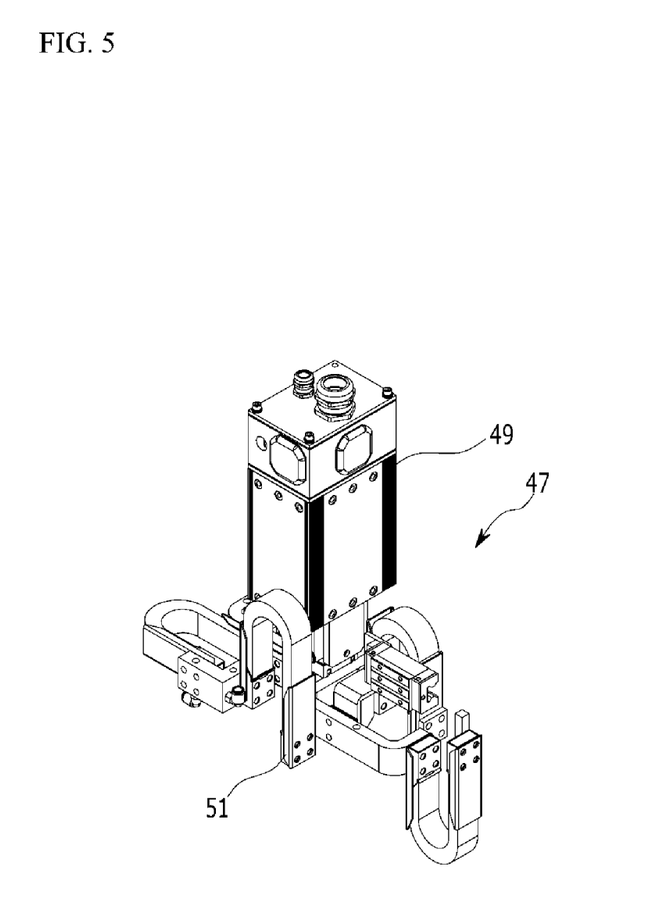
FIG. 5 is a perspective view of a current conduction unit of the spot welding apparatus according to the exemplary embodiment of the present invention.

Meanwhile, a current conduction unit 47 that conducts current to the upper welding gun 5 and the lower welding gun 9 may be installed on the fixation panel 3.

FIG. 5 is a perspective view of a current conduction unit of the spot welding apparatus according to the exemplary embodiment of the present invention. Referring to FIG. 5, the current conduction unit 47 includes a transformer 49 and a bus bar 51. The transformer 49 is installed on the fixation panel 3, and the bus bar 51 is connected with the transformer 49 to conduct current to the upper welding gun 5 and the lower welding gun 9. The current conduction unit 47 installed in the spot welding apparatus 1 has a known function which is widely used in the art and a more detailed description will be omitted.

Figure 6:
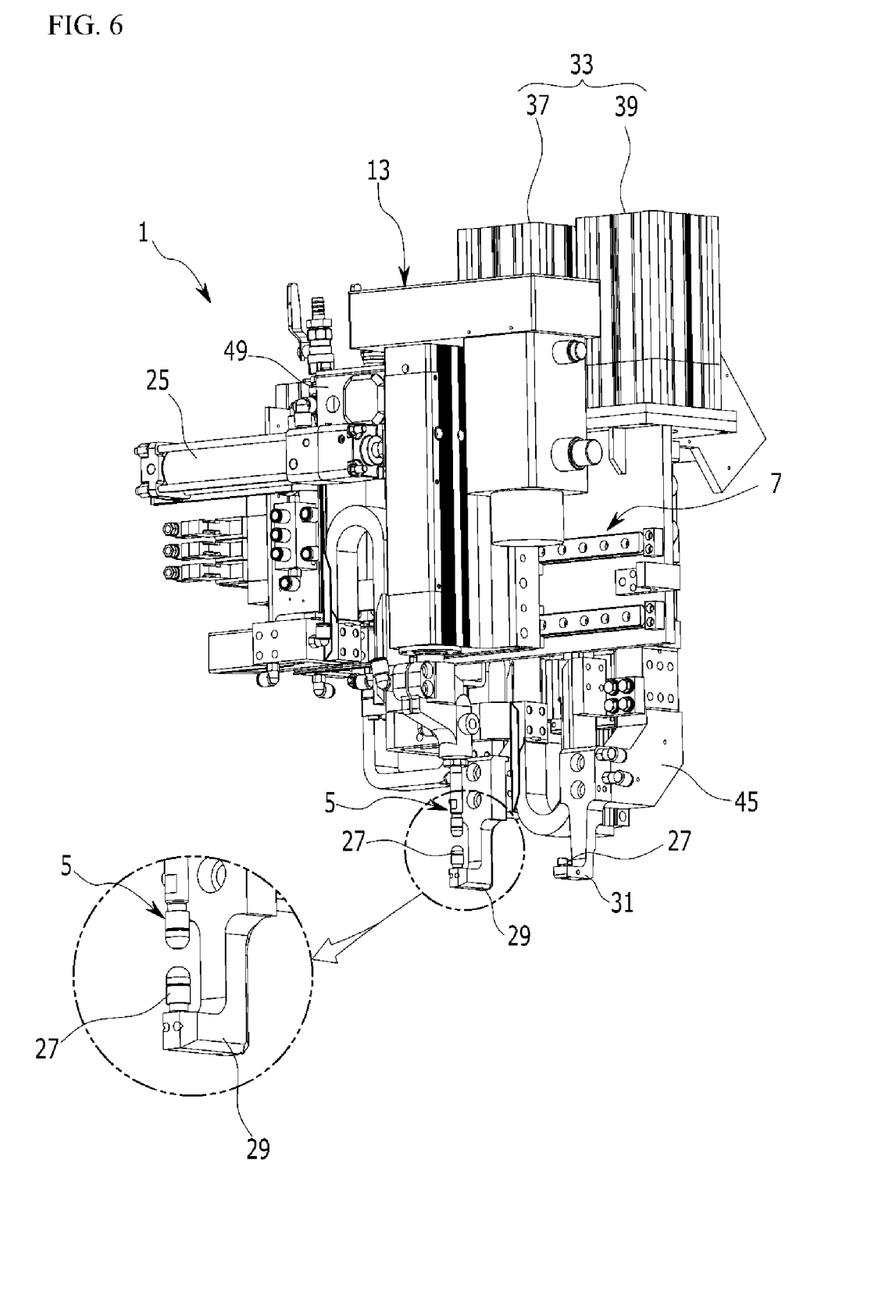
FIGS. 6 to 9 are operating diagrams of the spot welding apparatus according to the exemplary embodiment of the present invention.

Hereinafter, actuation of the spot welding apparatus 1 having such a configuration will be described with reference to FIGS. 6 and 7.

FIGS. 6 to 9 are operating diagrams of the spot welding apparatus according to the exemplary embodiment of the present invention. First, referring to FIG. 6, a state illustrated in the figure is a state before the spot welding apparatus 1 performs the welding operation and when the welding operation is performed, the spot welding apparatus 1 moves to a welding spot of a welding target by actuation of a robot.

Figure 7:
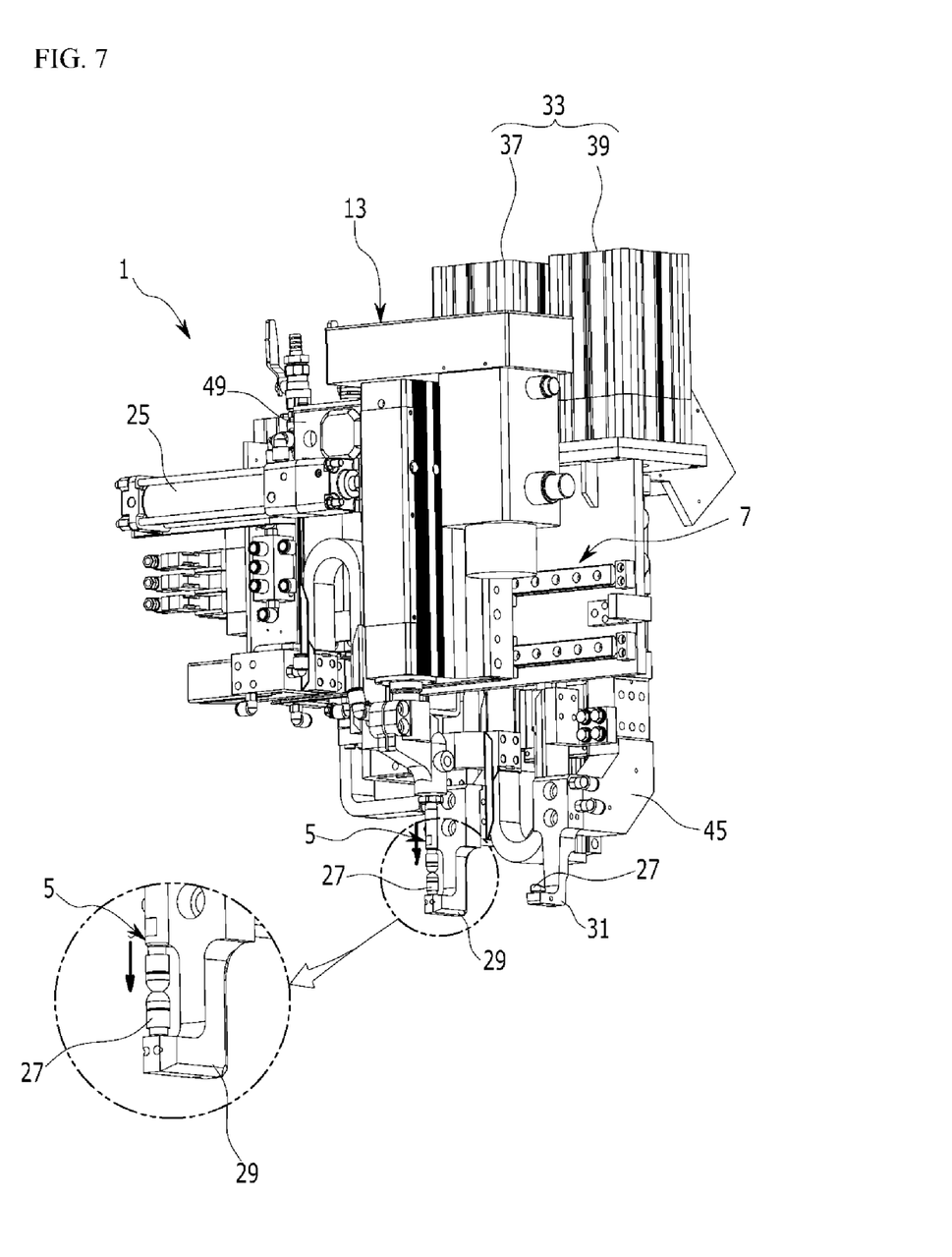

Thereafter, when the welding operation is performed, the first lower welding gun 29 supports the bottom of the welding spot while the first lower welding gun 29 descends by actuation of the first cylinder 37 of the upper and lower moving unit 11 as illustrated in FIG. 7.

In addition, the upper welding gun 5 performs the welding operation by pressing the top of the welding spot while the upper welding gun 5 descends by actuation of the pressing unit 13.

Figure 8:
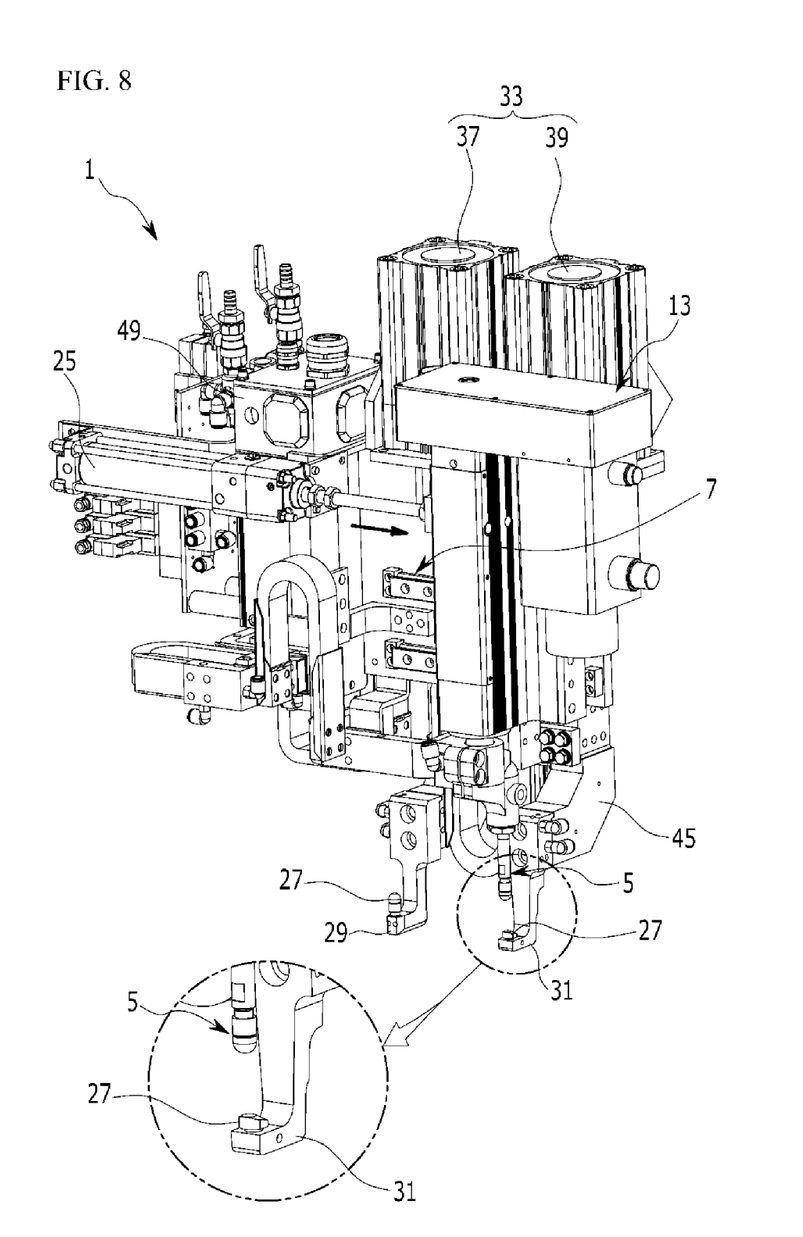

Meanwhile, when the second lower welding gun 31 is required due to a change in shape and position of the welding spot of the welding target, the cylinder 25 of the left and right moving unit 7 is actuated to move the pressing unit 13 connected with the upper welding gun 5 to the top of the second lower welding gun 31 as illustrated in FIG. 8.

Figure 9:
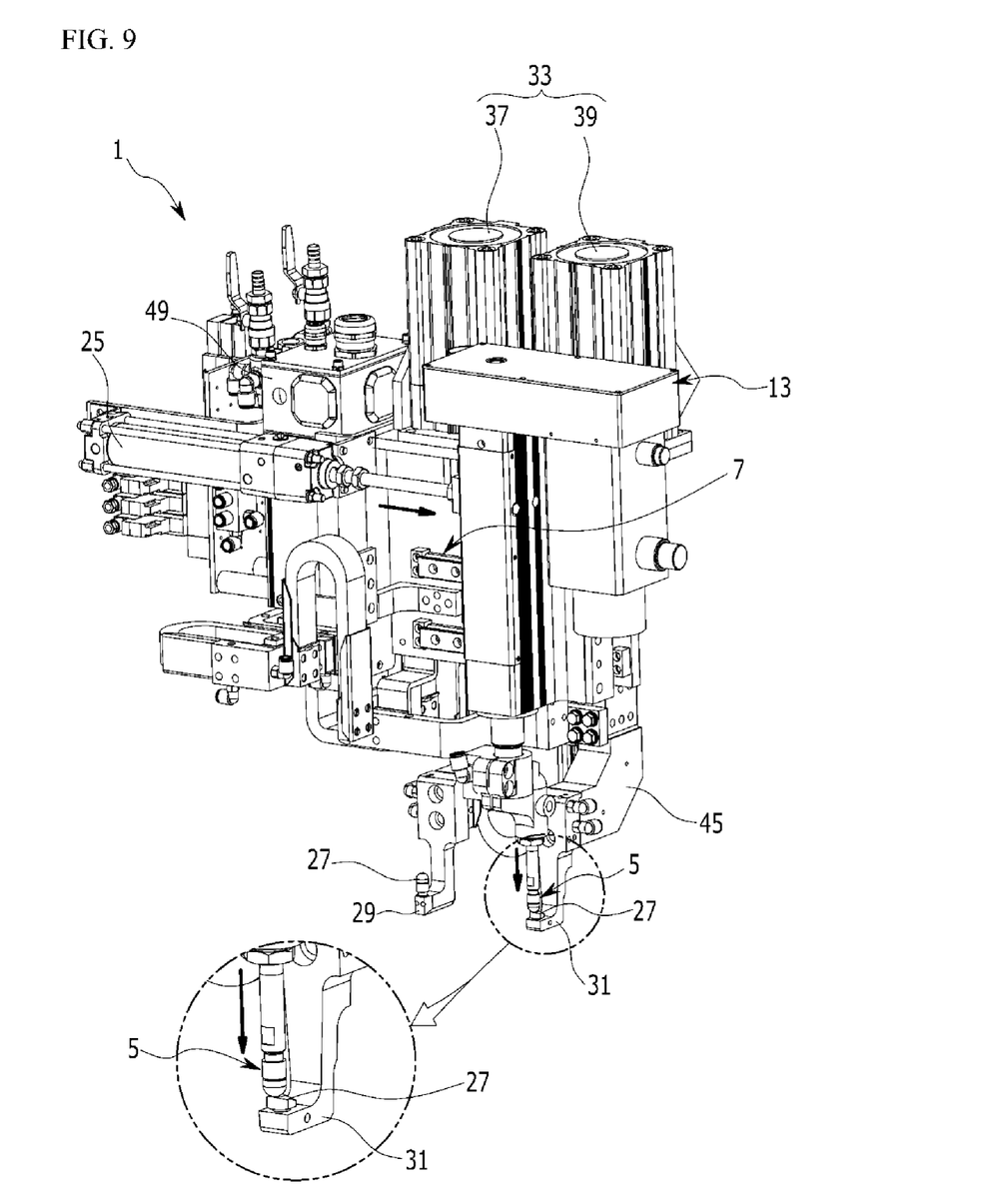

Thereafter, when the welding operation is performed, the first lower welding gun 29 is restored to an original state and the second lower welding gun 31 supports the bottom of the welding spot while the second lower welding gun 31 descends by actuation of the second cylinder 39 of the upper and lower moving unit 11 as illustrated in FIG. 9.

In addition, the upper welding gun 5 performs the welding operation by pressing the top of the welding spot while the upper welding gun 5 descends by actuation of the pressing unit 13.

Advantageously, the spot welding apparatus 1 according to the exemplary embodiment of the present invention performs the welding operation by varying the position of the upper welding gun 5 toward the corresponding first or second lower welding gun 29 or 31 between the first and second lower welding guns 29 and 31 according to the position and the shape of the welding spot to flexibly cope with the shapes and the positions of the various welding spots.

Further, the welding operation is performed by automatically selecting the first or second lower welding gun 29 or 31 according to various welding spots of the welding target to rapidly perform welding operation in a limited amount of space with a minimum time amount of time.

Additionally, the spot welding apparatus can be universally applied to multi vehicle models regardless of a vehicle model, and the position and the shape of a welding spot and enables a rapid welding operation to improve productivity, and flexibility and efficiency of a vehicle body process, and reduce the number of robots installed on a manufacturing line through application of one apparatus to save facility investment cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 1: Spot welding apparatus | 3: Fixation panel |
| 5: Upper welding gun | 7: Left and right moving unit |
| 9: Lower welding gun | 11: Upper and lower moving unit |
| 13: Pressing unit | 15: Gear box |
| 17: Pressing actuator | 19: Vertical case |
| 21: Rail | 23: Slide block |
| 25: Cylinder | 27: Welding tip |
| 29: First lower welding gun | 31: Second lower welding gun |
| 33: Cylinder | 35: Ascending and descending means |
| 37: First cylinder | 39: Second cylinder |
| 41: Vertical rail | 43: Guide block |
| 45: Arm | 47: Current conduction unit |
| 49: Transformer | 51: Bus bar |

What is claimed is:

1. A spot welding apparatus, comprising:
   a fixation panel mounted on an arm of a robot;
   an upper welding gun vertically installed on a front of the fixation panel, reciprocating vertically through a pressing unit;
   a left and right moving unit installed between the fixation panel and the pressing unit to move the upper welding gun horizontally, wherein the left and right moving unit includes:
      a rail horizontally installed on the fixation panel;
      a slide block installed on the rail and connected with the pressing unit; and
      a cylinder provided at one side of the pressing unit to move the pressing unit horizontally on the rail;
   two or more lower welding guns horizontally disposed to correspond to the upper welding gun; and
   an upper and lower moving unit installed on the fixation panel to reciprocate the lower welding gun vertically.

2. The spot welding apparatus of claim 1, wherein:
   the pressing unit includes:
      a gear box provided at a top of the upper welding gun;
      a pressing actuator mounted on one lower side of the gear box; and
      a moving block vertically installed on another lower side of the gear box and reciprocating on a screw shaft that is rotated by receiving actuation of the pressing actuator through the gear box.

3. The spot welding apparatus of claim 1, wherein:
   the pressing actuator is formed by a step motor of which an RPM and a rotational direction are controllable.

4. The spot welding apparatus of claim 1, wherein:
   in the left and right moving unit, the rails and the slide blocks are configured in a plurality on the fixation panel.

5. The spot welding apparatus of claim 1, wherein:
   the upper and lower moving unit includes:
      a cylinder connected to correspond to the lower welding guns on the fixation panel in the rear of the pressing unit; and
      an ascending and descending means installed between the lower welding guns and the fixation panel to guide ascension and descension of the lower welding guns by actuation of the cylinder.

6. The spot welding apparatus of claim 5, wherein:
   the ascending and descending means include:
      a vertical rail installed on the fixation panel; and
      a guide block joined to the vertical rail and connected with the arm of each of the lower welding guns.

7. The spot welding apparatus of claim 1, wherein:
   the lower welding guns includes first and second lower welding guns having different shaped welding tips.

8. The spot welding apparatus of claim 7, wherein:
   the cylinder includes a first cylinder and a second cylinder that correspond to the first and second lower welding guns.

9. The spot welding apparatus of claim 1, wherein:
   a current conduction unit that conducts current to the upper welding gun and the lower welding guns is installed on the fixation panel.

10. The spot welding apparatus of claim 9, wherein:
    the current conduction unit includes:
       a transformer installed on the fixation panel; and
       a bus bar connected with the transformer to conduct current to the upper welding gun and the lower welding guns.

* * * * *